United States Patent
Curtis et al.

(10) Patent No.: US 12,078,228 B2
(45) Date of Patent: Sep. 3, 2024

(54) SCREW DRIVE WITH SELF-LOCKING MECHANISM

(71) Applicant: Eaton Intelligent Power Limited, Dublin (IE)

(72) Inventors: Tyler Quincey Curtis, Rockford, MI (US); Daniel Henry Roberts, Monrovia, CA (US); Xingmin Cai, Simsbury, CT (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 17/577,936

(22) Filed: Jan. 18, 2022

(65) Prior Publication Data

US 2022/0228654 A1    Jul. 21, 2022

Related U.S. Application Data

(60) Provisional application No. 63/139,574, filed on Jan. 20, 2021.

(51) Int. Cl.
*F16H 25/24*    (2006.01)
*F16H 25/20*    (2006.01)

(52) U.S. Cl.
CPC . *F16H 25/2454* (2013.01); *F16H 2025/2062* (2013.01)

(58) Field of Classification Search
CPC .............. F16H 25/2454; F16H 2025/2062
See application file for complete search history.

(56) References Cited

U.S. PATENT DOCUMENTS

| | | | | |
|---|---|---|---|---|
| 3,583,248 A | * | 6/1971 | Langenberg | F16H 25/2454 74/89.39 |
| 4,030,578 A | * | 6/1977 | Cacciola | F16D 59/00 188/134 |
| 4,459,867 A | * | 7/1984 | Jones | F16H 25/2204 74/412 TA |
| 5,299,666 A | * | 4/1994 | Lang | F16D 67/02 188/134 |
| 6,109,415 A | | 8/2000 | Morgan et al. | |
| 6,631,797 B2 | * | 10/2003 | Capewell | B64C 13/28 184/5 |
| 6,719,106 B1 | * | 4/2004 | Gardner | B64C 13/28 192/70.14 |
| 9,394,980 B2 | * | 7/2016 | Jones | F16H 25/2454 |
| 10,066,715 B2 | * | 9/2018 | Larson | B64C 13/341 |
| 10,443,696 B1 | * | 10/2019 | Latif | B64C 5/02 |
| 10,975,940 B2 | * | 4/2021 | Laskovy | F16H 25/2204 |

(Continued)

FOREIGN PATENT DOCUMENTS

EP    3 406 888 A1    11/2018

OTHER PUBLICATIONS

Extended European Search Report for Application No. 22152559.5 dated May 19, 2022.

*Primary Examiner* — William C Joyce
(74) *Attorney, Agent, or Firm* — Merchant & Gould P.C.

(57) ABSTRACT

A screw type linear actuator that includes a system for automatically fixing the nut in an axial position when it is retracted. When the system is commanded to operate the screw, the nut can automatically unlock. When the system screw is retracted fully, it automatically engages a mechanical lock. The lock does not require electrical power to remain engaged.

20 Claims, 14 Drawing Sheets

(56) References Cited

U.S. PATENT DOCUMENTS

| | | | |
|---|---|---|---|
| 11,067,156 B1* | 7/2021 | Heiberger | F16H 25/2454 |
| 11,181,073 B2* | 11/2021 | Werquin | F02K 1/763 |
| 11,230,367 B2* | 1/2022 | Bassett | F16D 59/00 |
| 11,505,313 B2* | 11/2022 | Bernard | F16H 25/2454 |
| 2007/0220998 A1 | 9/2007 | Kopecek | |
| 2018/0087637 A1* | 3/2018 | Bago | F16H 25/2454 |
| 2020/0217118 A1* | 7/2020 | Wirth | F16H 25/2454 |
| 2020/0292039 A1* | 9/2020 | Matsuto | F16H 25/22 |
| 2022/0126982 A1* | 4/2022 | Kulkarni | F16H 25/2454 |
| 2022/0196093 A1* | 6/2022 | Lin | F16H 25/20 |
| 2022/0252115 A1* | 8/2022 | Winkler | F16H 25/24 |

* cited by examiner

SCREW DRIVE WITH SELF-LOCKING MECHANISM

CROSS-REFERENCE TO RELATED APPLICATION

This application claims priority to U.S. Provisional Application Ser. No. 63/139,574, filed on Jan. 20, 2021, the disclosure of which is incorporated herein by reference in its entirety.

TECHNICAL FIELD

Screw drive systems and more particularly screw drive systems with mechanical locking mechanisms.

BACKGROUND

Screw drive type linear actuators typically include a longitudinal screw and a nut that rides on the screw. As the screw is driven to rotate about its longitudinal axis, the nut translates axially. Rotating the screw drive in a first direction will cause the nut to extend and rotating the screw drive in a second direction will cause the nut to retract. In some applications, it is desirable to be able to mechanically fix the axial position of the nut on the shaft to prevent uncommanded motion of the nut. Fixing the axial position of the nut is particularly desirable when the nut is subject to external loads.

SUMMARY

The present disclosure provides a screw type linear actuator that includes a system for automatically fixing the nut in an axial position when it is retracted. In the depicted embodiment, when the system is commanded to operate the screw, the nut can automatically unlock. When the system screw is retracted fully, it automatically engages a mechanical lock. In the depicted embodiment, the lock does not require electrical power to remain engaged.

BRIEF DESCRIPTION OF THE FIGURES

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION

Figure 1:
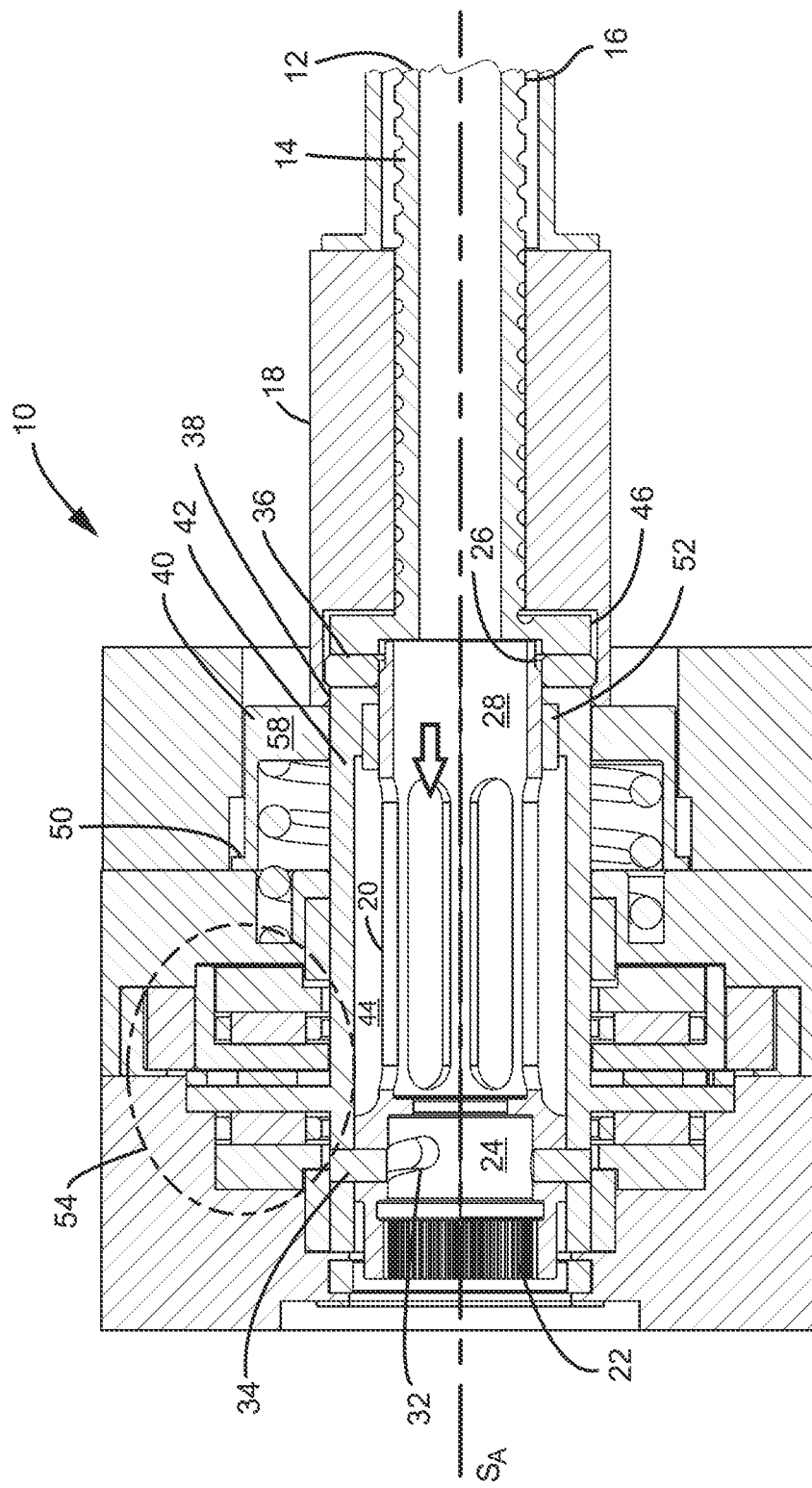
FIG. 1 is a cross-section of an embodiment of the screw drive of the present disclosure in a first state.
Figure 2:
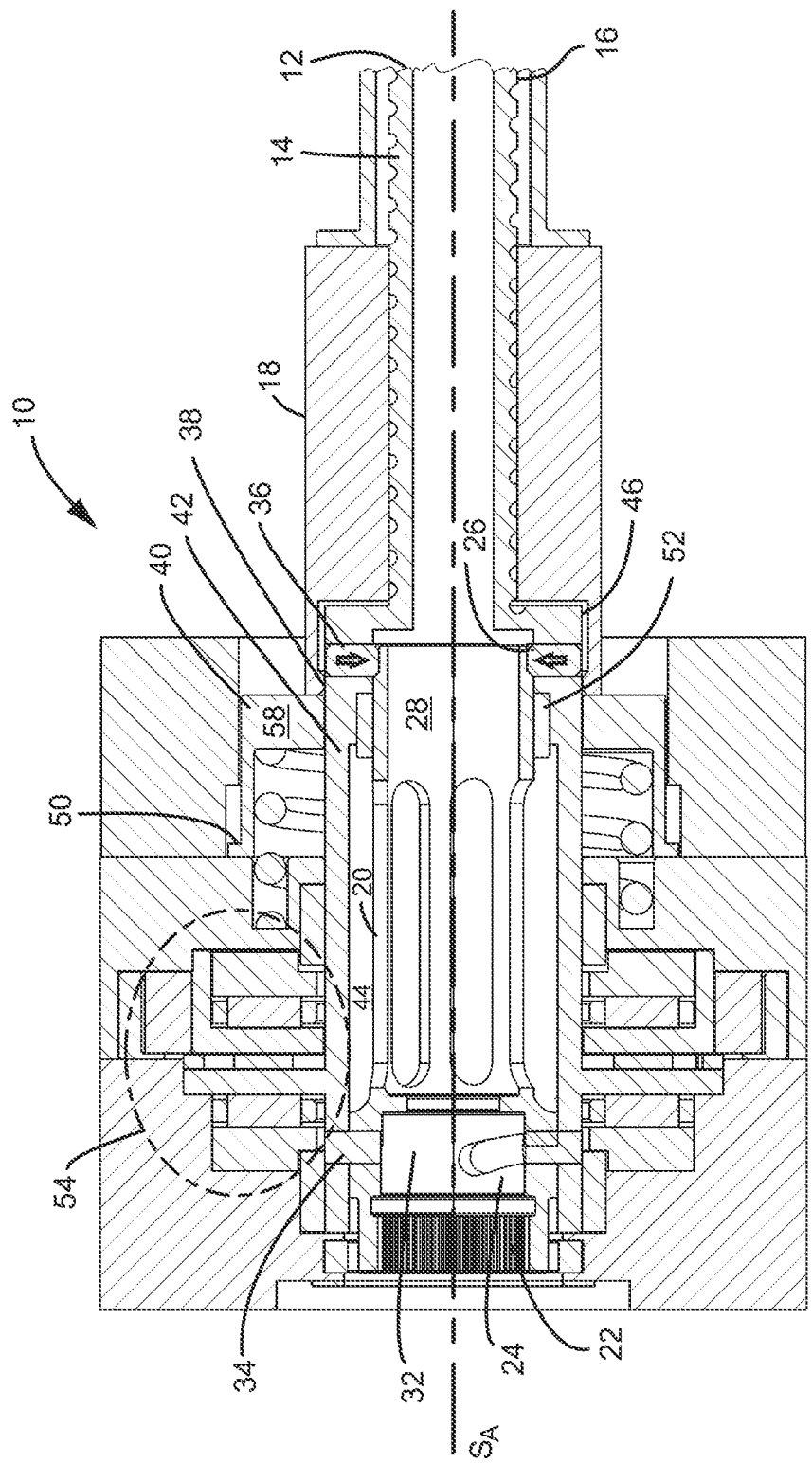
FIG. 2 is a cross-section of the screw drive of FIG. 1 in a second state.
Figure 3:
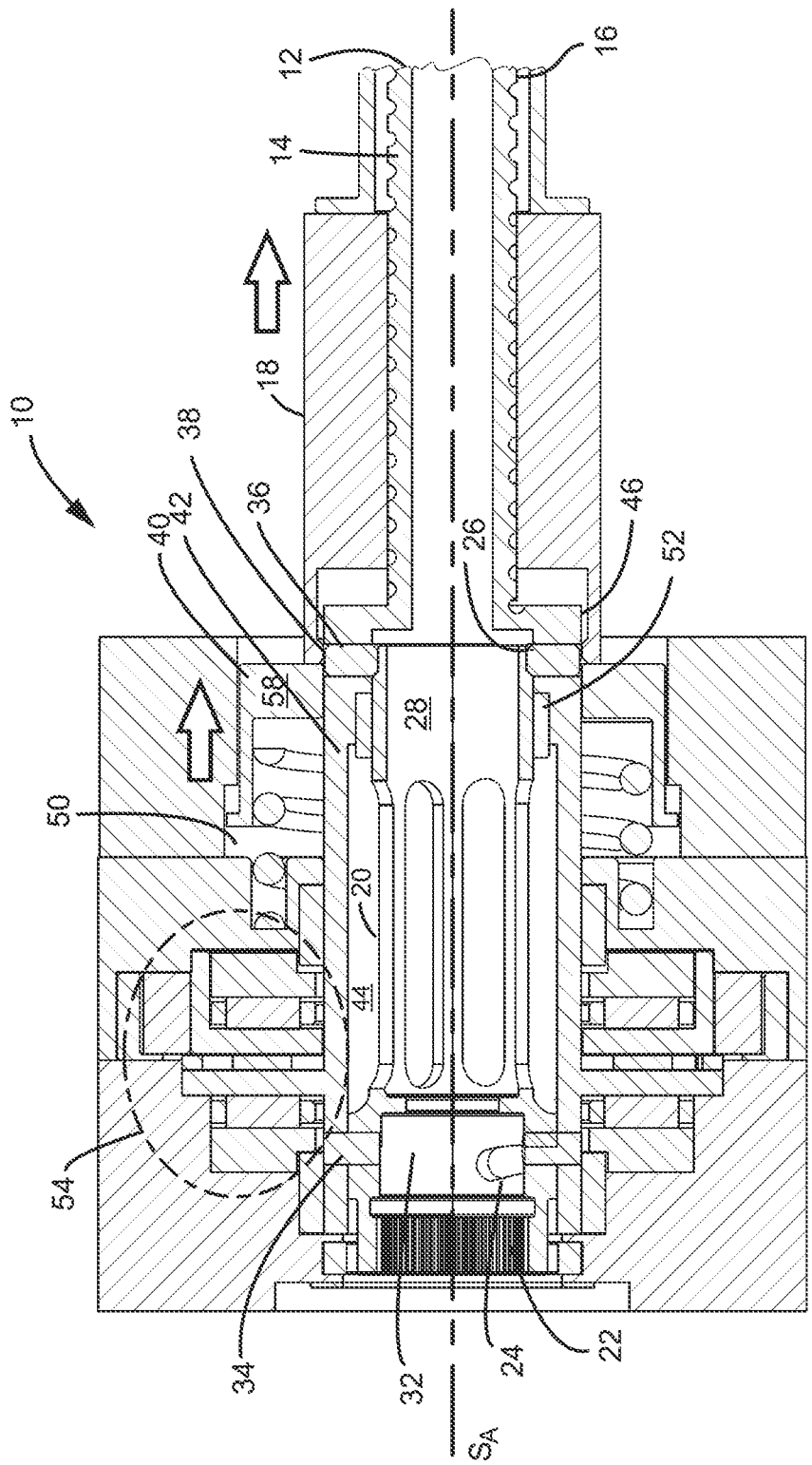
FIG. 3 is a cross-section of the screw drive of FIG. 1 in a third state.
Figure 4:
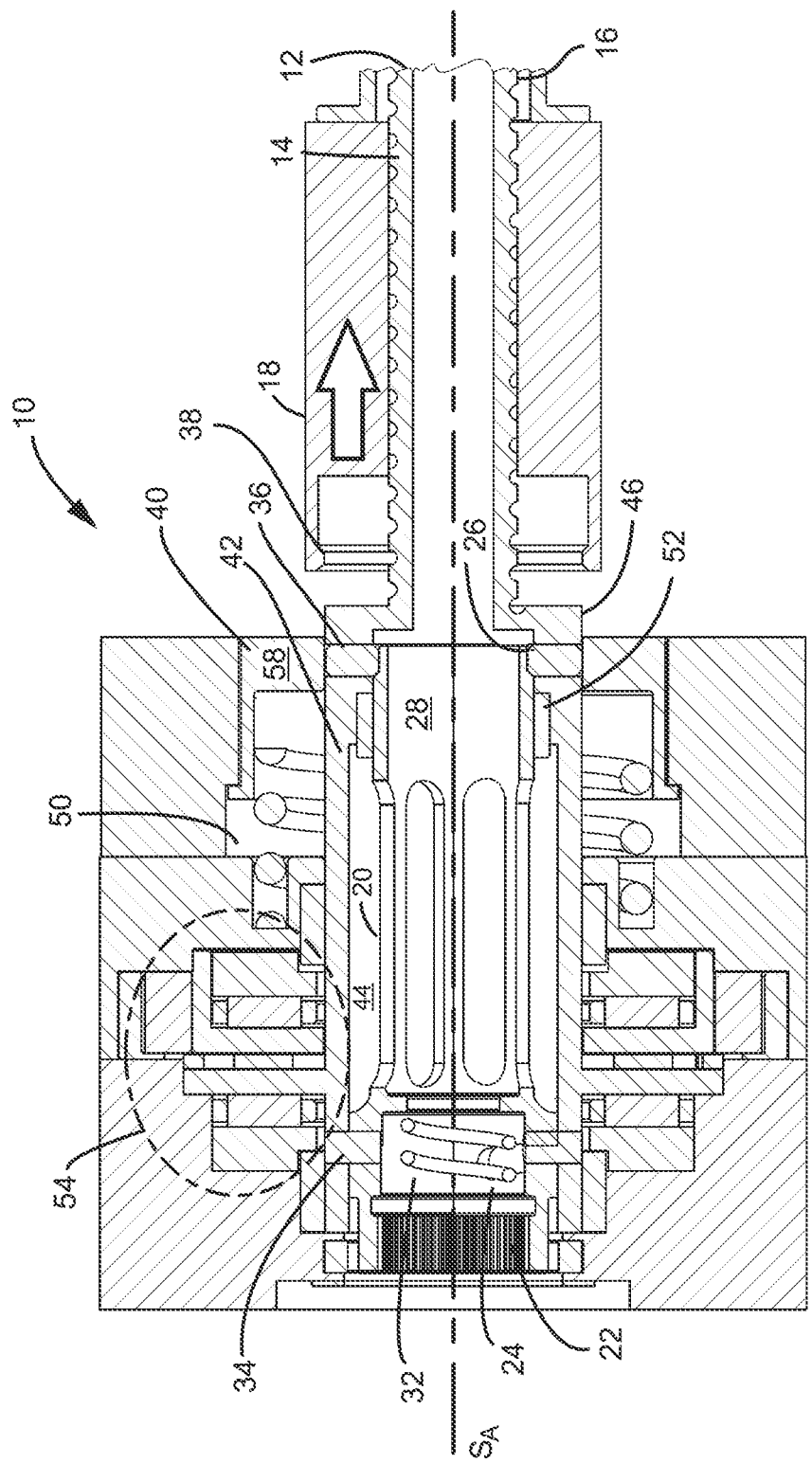
FIG. 4 is a cross-section of the screw drive of FIG. 1 in a fourth state.
Figure 5:
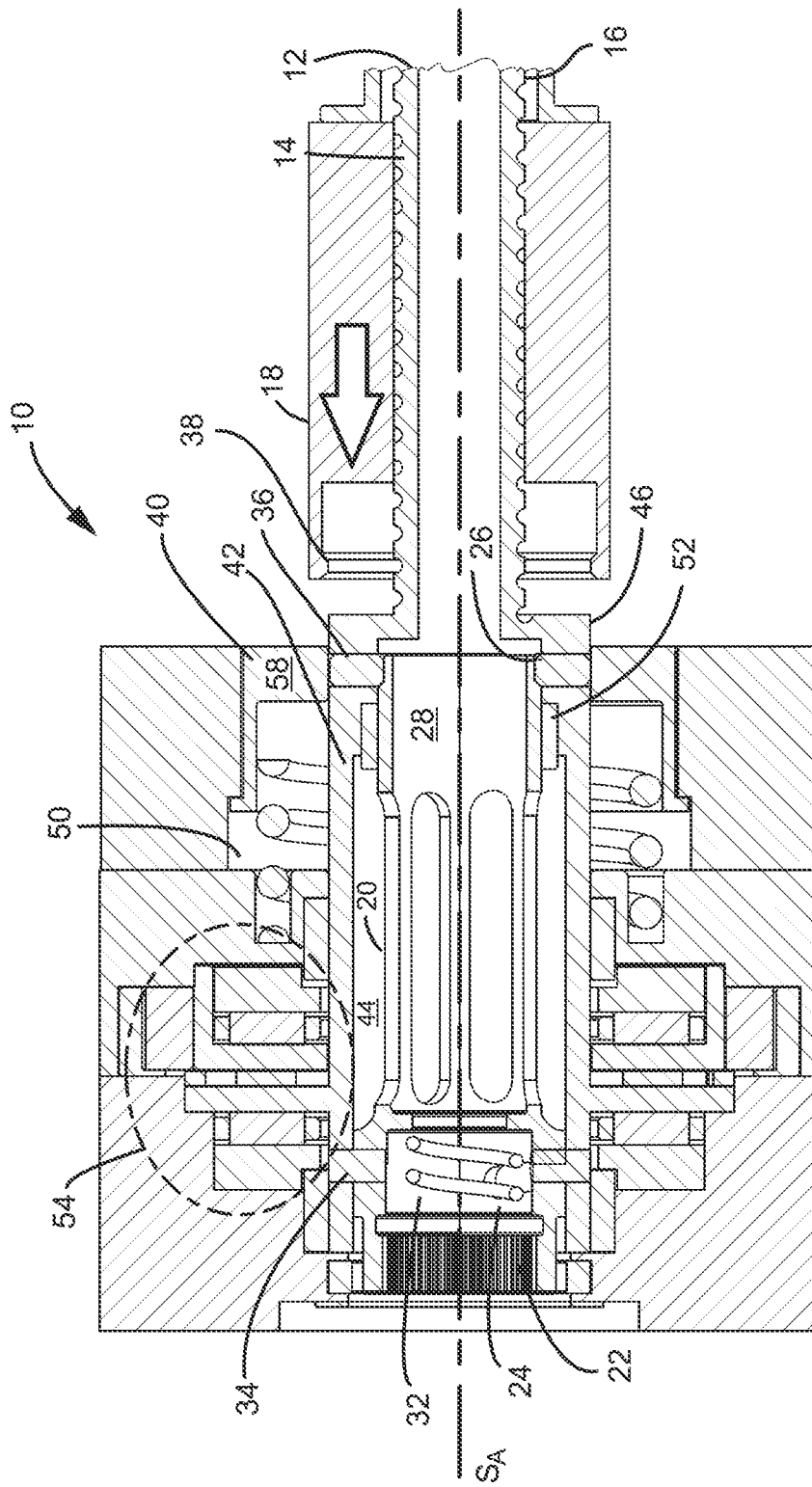
FIG. 5 is a cross-section of the screw drive of FIG. 1 in a fifth state.
Figure 6:
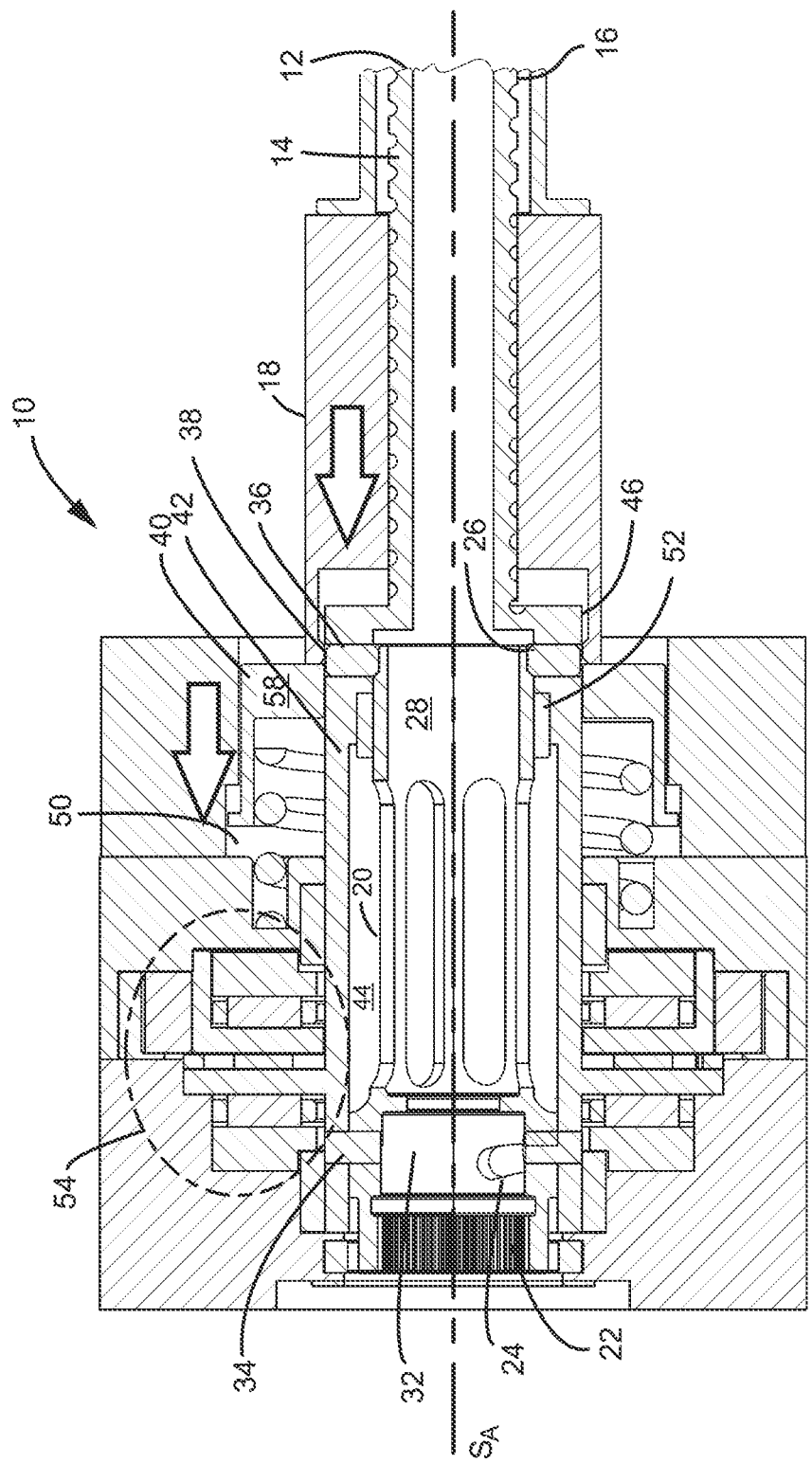
FIG. 6 is a cross-section of the screw drive of FIG. 1 in a sixth state.
Figure 7:
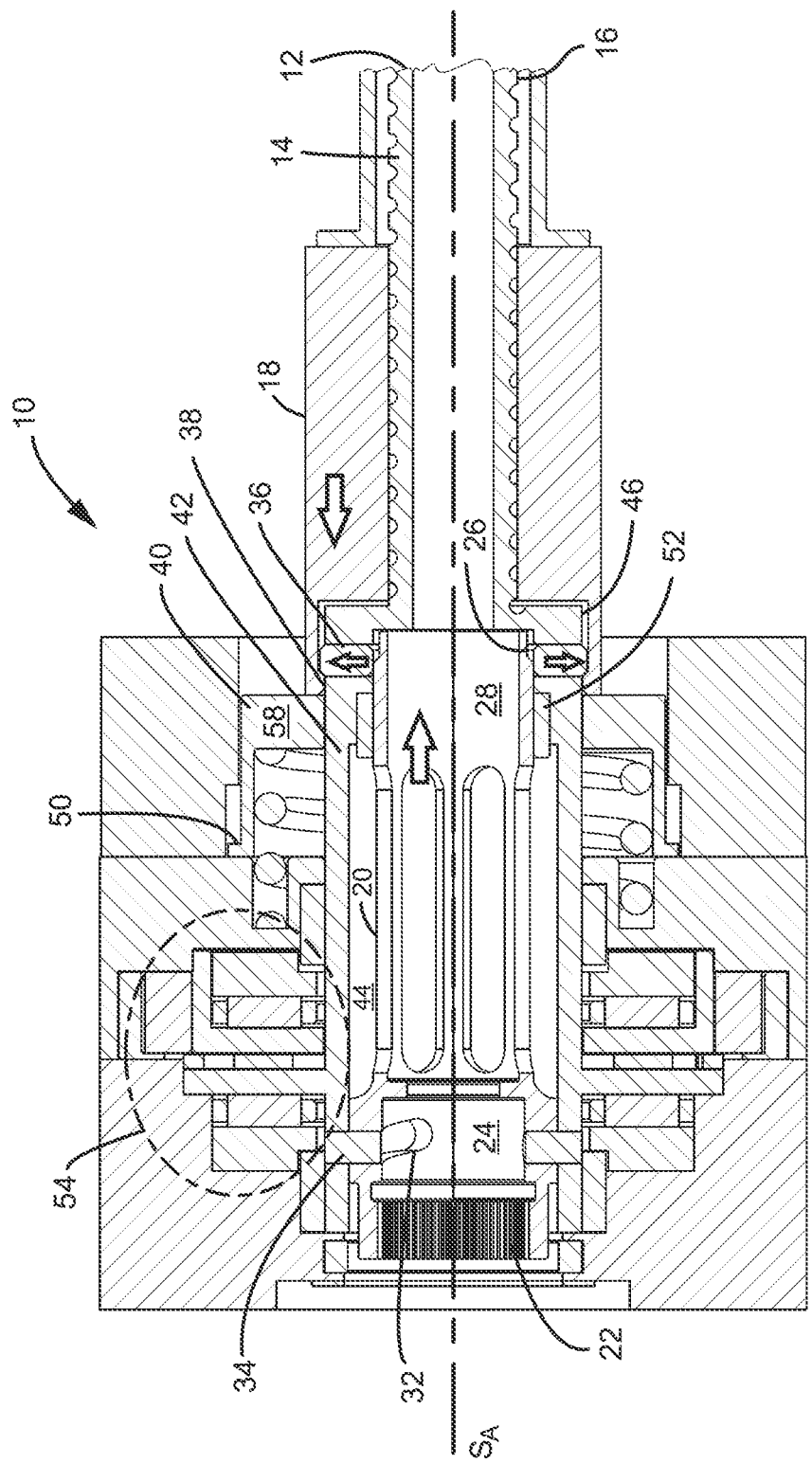
FIG. 7 is a cross-section of the screw drive of FIG. 1 in a seventh state.
Figure 8:
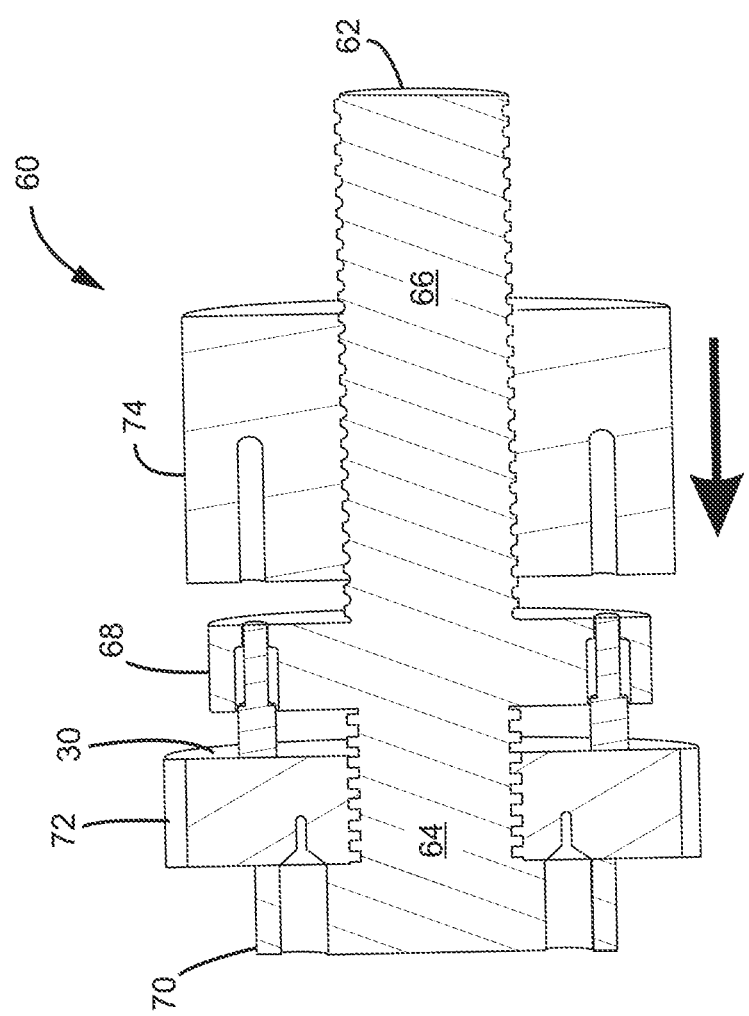
FIG. 8 is a cross-section of an alternative embodiment of the screw drive of FIG. 1 in a first state.
Figure 9:
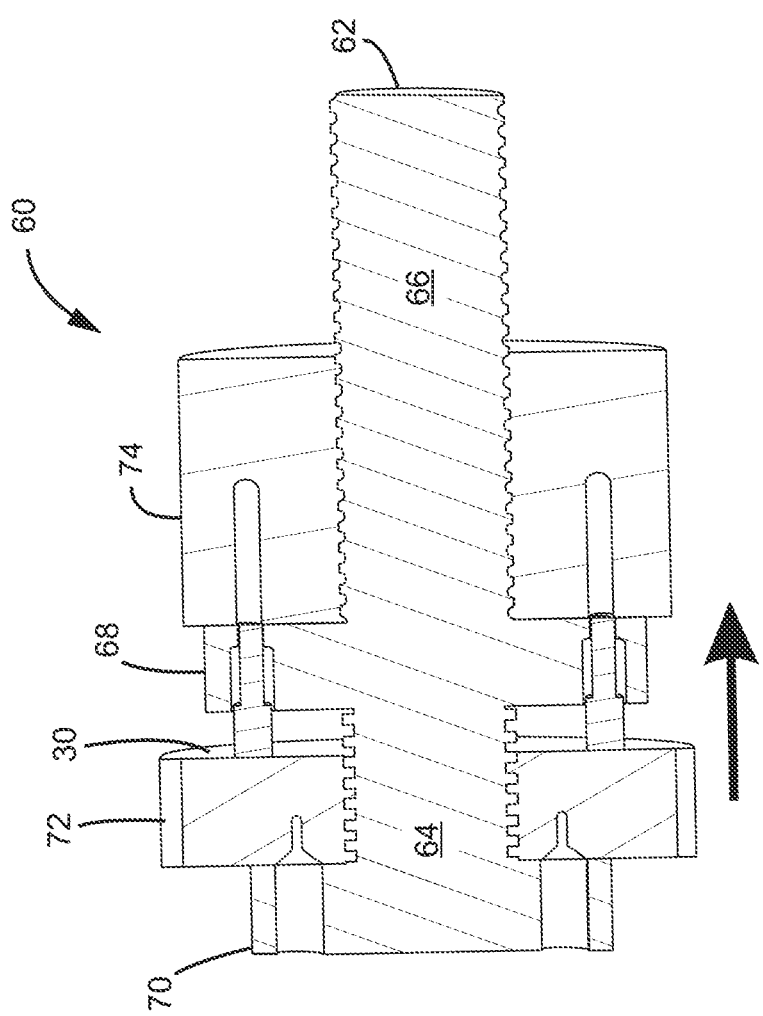
FIG. 9 is a cross-section of the screw drive of FIG. 8 in a second state.
Figure 10:
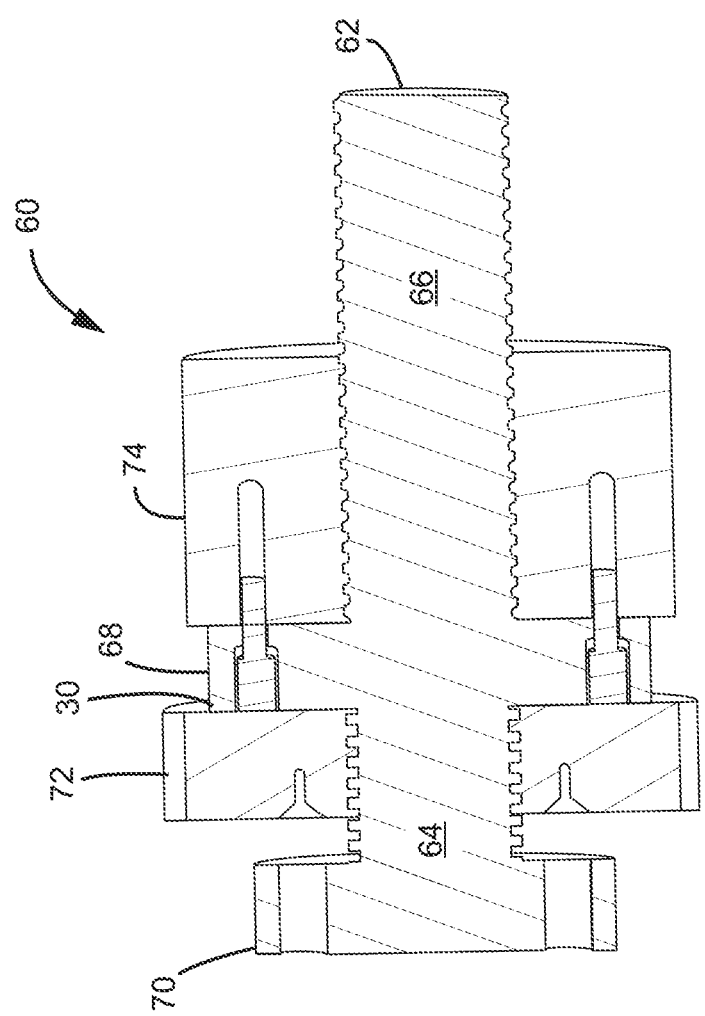
FIG. 10 is a cross-section of the screw drive of FIG. 8 in a third state.
Figure 11:
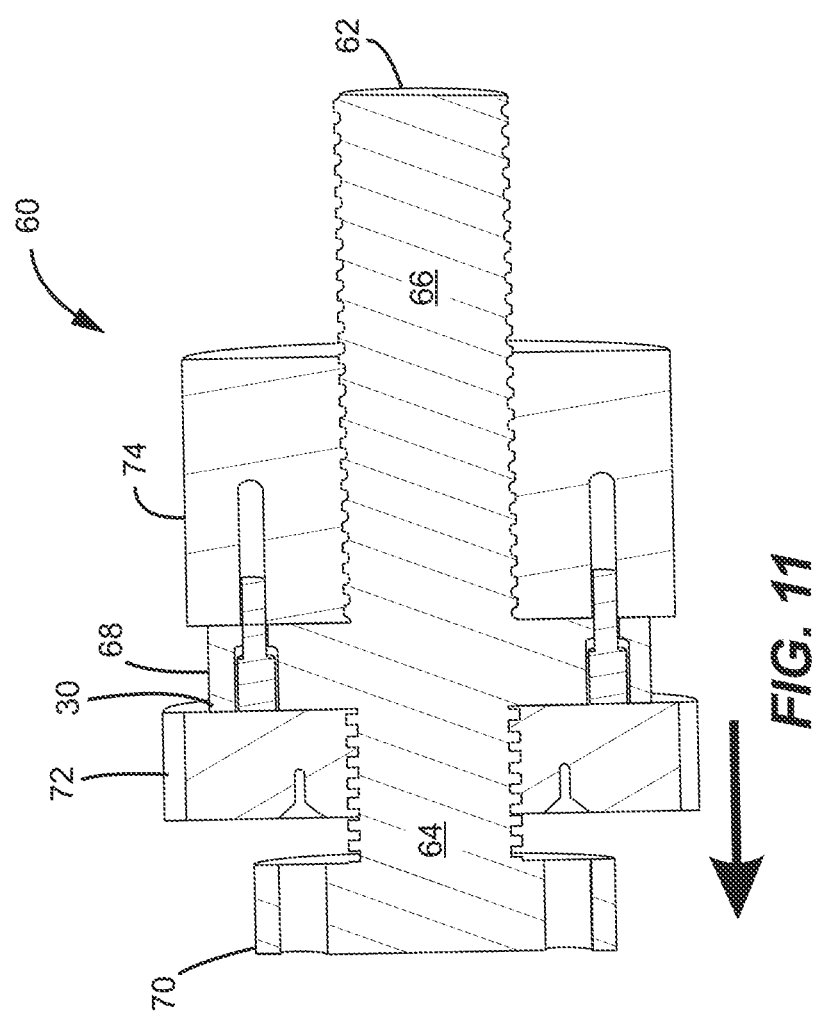
FIG. 11 is a cross-section of the screw drive of FIG. 8 in a fourth state.
Figure 12:
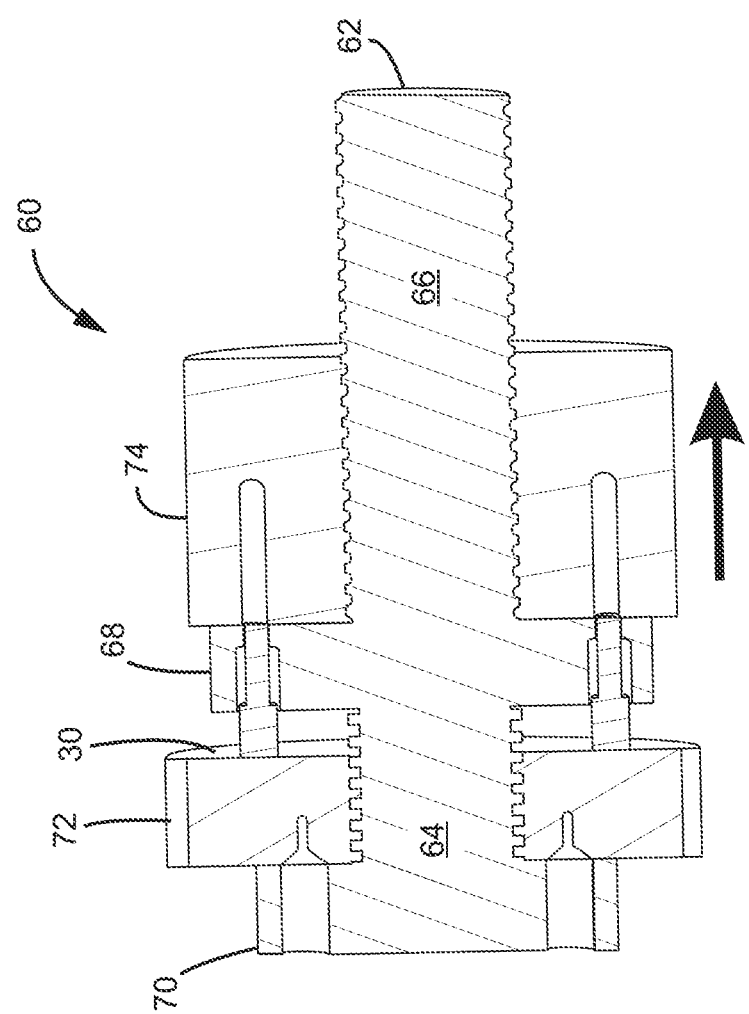
FIG. 12 is a cross-section of the screw drive of FIG. 8 in a fifth state.
Figure 13:
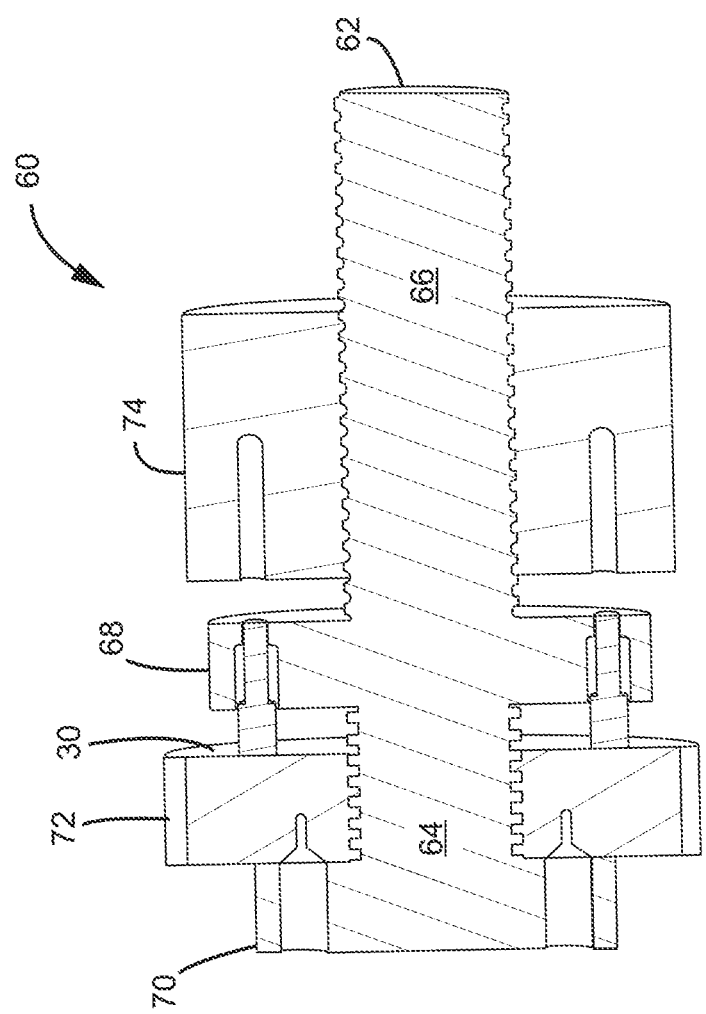
FIG. 13 is a cross-section of the screw drive of FIG. 8 in a sixth state.

Reference will now be made in detail to embodiments of the present disclosure, examples of which are described herein and illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as defined by the appended claims.

Referring to the figures, the actuator of the present disclosure is described herein in further detail. In the depicted embodiment, the linear actuator 10 includes a screw 12 including a first end portion 42 and a second end portion 14. In the depicted embodiment, both the first end portion 42 and the second end portion 14 include cylindrical shaft portions that define a common longitudinal screw axis SA. In the depicted embodiment, the second end portion 14 includes a screw thread 16 defined on an exterior surface. It should be appreciated that many alternative configurations are possible.

In the depicted embodiment, the linear actuator 10 includes a nut 18 coaxially arranged on the second end portion 14 of the screw 12. In the depicted embodiment, the nut 18 has an inner aperture that is configured to mate with the screw thread 16 of the second cylindrical portion of the screw 12. In the depicted embodiment, the nut 18 is configured to axially translate along the second end portion 14 of the screw 12 from a retracted position to an extended position when the screw 12 is rotated relative to the nut 18. It should be appreciated that many alternative configurations are possible.

In the depicted embodiment, the linear actuator 10 includes a torque transmitting screw drive member that is configured to transmit torque to the screw 12 to drive the rotation of the screw 12. Referring more particularly to FIGS. 1-7, in one depicted embodiment of the actuator of the present disclosure, the torque transmitting screw drive member takes the form of a sliding drive gear 20 that includes a female gear 22 (e.g., a female spline gear) at a first end 24 and a cylindrical locking segment interface surface 26 at an opposed second end 28. It should be appreciated that many other alternative configurations are possible. For example, referring more particularly to FIGS. 8-13, the torque transmitting screw drive member of the actuator 60 is a gear member 30 that has an inner aperture mated with a portion of the screw 12 and having a geared external cylindrical surface. This alternative configuration of the torque transmitting screw drive member will be described in further detail below with reference to the embodiment depicted in FIGS. 8-13. It should be appreciated that many other alternative configurations are also possible.

In the depicted embodiment, the linear actuator 10 includes a mechanical nut locking system configured to automatically lock the nut 18 when the nut 18 is retracted. In the depicted embodiment, the mechanical nut locking system is configured to automatically disengage the mechanical lock when the torque transmitting screw drive member is driven to transmit torque to the screw 12 in a direction that extends the nut 18. In the depicted embodiment, the locking and unlocking of the nut 18 happens automatically as part of the normal operation of the actuator 10. It should be appreciated that many alternative embodiments are possible including embodiments wherein the locking is less automatic or manual.

In the depicted embodiment, when the torque transmitting screw drive member is rotated in a direction to extend the nut 18 (e.g., clockwise), the torque transmitting screw drive member translates axially prior to transmitting substantial torque to the screw 12. In the depicted embodiment, the axial translation of the torque transmitting screw drive member operates to disengage (unlock) the mechanical nut locking system. After the mechanical nut locking system is disengaged as a result of the translational movement of the torque transmitting screw drive member, additional rotation of the torque transmitting screw drive member causes the screw 12 to rotate thereby extending the nut 18. It should be appreciated that many other alternative configurations are also possible.

In the depicted embodiment, when the torque transmitting screw drive member is driven to retract the nut 18 from an extended position, the screw drive member rotates the screw 12 to retract the nut 18. After the nut 18 is retracted, the torque transmitting screw drive member subsequently translates axially without further rotating the screw 12 and this translation engages (locks) the mechanical nut locking system. In the depicted embodiment, the translational movement at both ends of the process is referred to as "loss motion" as there is rotation of the torque transmitting screw drive member that does not directly result in axial translation of the nut 18. It should be appreciated that many other alternative configurations are also possible.

As discussed above, in one depicted embodiment, the torque transmitting screw drive member is a sliding drive gear 20 shown in FIGS. 1-7. In this depicted embodiment, the sliding drive gear 20 is generally cylindrical and includes a female gear 22 at a first end 24. In the depicted embodiment, the sliding drive gear 20 includes an annular cavity that has a geared periphery which is configured to engage a geared drive gear/shaft. In the depicted embodiment, the sliding drive gear 20 includes a cylindrical locking segment interface surface 26 at a second end 28. In the depicted embodiment, the cylindrical locking segment interface surface 26 selectively supports the locking segments. In the depicted embodiment, the sliding drive gear 20 includes a helical slot 32 that engages a pin 34 that extends inwardly from the first end portion 42 of the screw 12. In the depicted embodiment, the helical slot 32 and pin 34 configuration enables the torque transmitting screw drive member to rotate without rotating the screw 12. It should be appreciated that many alternative configurations are possible.

In the depicted embodiment, the mechanical nut locking system includes one or more locking members 36 that extend through a portion of the first end portion 42 of the screw 12. In the depicted embodiment, the locking member 36 is a segmented ring. In the depicted embodiment, the locking members 36 are configured to selectively engage a retaining lip 38 of the nut 18. The locking members 36 can be ball bearing structures, pin structures, spring loaded stops, a segmented ring, or any number of other structures. The segments in the depicted embodiment move radially based on the ramped geometry of the cylindrical locking segment interface surface 26. In an alternative embodiment, the locking members 36 can be spring biased in a particular direction such as radially inwardly or outwardly. It should be appreciated that many alternative configurations are possible.

In the depicted embodiment, the mechanical nut locking system includes a locking member retention sleeve 40. In the depicted embodiment, the locking member retention sleeve 40 is coaxial with the first end portion 42 of the screw 12 and is spring biased toward the second end portion 14 of the screw 12. In the depicted embodiment, the locking member retention sleeve 40 includes a shoulder that slides on the first end portion 42 of the screw 12. In the depicted embodiment, the locking member retention sleeve 40 rides against the nut 18 when the nut 18 is retracted and slides into place over the locking members 36 as the nut 18 begins to extend. The locking member retention sleeve 40 of the depicted embodiment prevents the locking members 36 from moving out of position. It should be appreciated that many other alternative retention configurations are possible.

In the depicted embodiment, the first end portion 42 of the screw 12 defines a cylindrical cavity 44 concentric about a longitudinal screw axis SA. In the depicted embodiment, the sliding drive gear 20 is positioned within the cavity 44. In the depicted embodiment, a bearing 52 interfaces between the sliding drive gear 20 and the nut cavity. It should be appreciated that additional bearings could be incorporated or the existing bearings could be eliminated. Many alternative configurations are possible.

In the depicted embodiment, the nut 18 includes a first end portion that defines a cylindrical nut cavity 46 that is configured to receive a portion of the first end portion 42 of the screw 12. In the depicted embodiment, the nut cavity 46 includes an inwardly radially extending retaining lip 38. In the depicted embodiment, the sliding drive gear 20 is configured to translate axially which radially biases the locking members 36 into engagement with the retaining lip 38 of the nut cavity 46. As discussed above, the sliding drive gear 20 is configured to rotate about the screw axis SA and translate axially without rotating the screw 12. Since the screw 12 does not rotate during the axial translation of the sliding drive gear 20, the nut 18 remains stationary during the locking and unlocking operations. In the depicted embodiment, the initial rotation of the sliding drive gear 20 in a first direction translates the sliding drive gear 20 without rotating the screw 12 and subsequent rotation of the sliding drive gear 20 in the first direction rotates the screw 12 and drives axial motion of the nut 18. It should be appreciated that many alternative configurations are possible.

In the depicted embodiment, the actuator 10 includes a no-back system 54 arranged about the first end portion 42 of the screw 12. No-back systems are useful to prevent back driving of the nut 18 when the nut 18 is extended or partially extended. No-back systems can be used with the actuator of the present disclosure. For additional information regarding no-back systems see U.S. Pat. No. 6,109,415 to Morgan et al. filed on May 29, 1998, which is hereby incorporated by reference in its entirety.

In the depicted embodiment, the actuator 10 comprises a locking member retention sleeve 40 coaxially arranged with the first end portion 42 of the screw 12. In the depicted embodiment, the segment retention sleeve 40 is spring biased toward the second end portion 14 of the screw 12. In the depicted embodiment, the locking member retention sleeve 40 includes a shoulder 58 that slides on the first end portion 42 of the screw 12 and a lip 50 that engages a portion of a housing to limit the axial translation of the locking member retention sleeve 40 in the second direction. In the depicted embodiment, the shoulder 58 in a first position retains the locking member 36 in the first end portion 42 of the screw 12. It should be appreciated that many alternative configurations are possible.

Referring to FIGS. 8-13, an alternative embodiment of the actuator of the present disclosure is described in further detail. In the depicted embodiment, the linear actuator 60 includes a screw 62 having a first cylindrical portion 64 and a second cylindrical portion 66. The first cylindrical portion 64 includes a first end and a second end. The first cylindrical portion 64 has a first hand screw thread (e.g., left hand thread) defined on an exterior surface. The second cylindrical portion 66 includes a first end and a second end. The second cylindrical portion 66 has a second hand screw thread (e.g., right hand thread) defined on an exterior surface. In the depicted embodiment, the actuator 60 includes a flange 68 located between the first cylindrical portion 64 and the second cylindrical portion 66. In the depicted embodiment, the actuator 60 includes a mechanical stop 70 located at the first end of the first cylindrical portion 64 of the screw 62. In the depicted embodiment, the mechanical stop 70 is also a flange. It should be appreciated that many alternative configurations are possible. For example, the flange 68 could be any mechanical stop.

In the depicted embodiment, the actuator 60 includes a nut 74 coaxially arranged on the second cylindrical portion 66 of the screw 62. The nut 74 includes an inner aperture mated with the second hand screw thread of the second cylindrical portion 66. It should be appreciated that many alternative embodiments are possible.

In the depicted embodiment, the actuator 60 includes a gear member 30 coaxially arranged on the first cylindrical portion 64 of the screw 62. In the depicted embodiment, the gear member 30 has an inner aperture mated with the first hand screw thread of the first cylindrical portion 64 of the screw 62. In the depicted embodiment, the gear member 30 defines a geared external cylindrical surface 72. The geared external cylindrical surface 72 functions as a planetary gear. It should be appreciated that many alternative embodiments are possible.

In the depicted embodiment, the gear member 30 is configured such that when torque is applied to the gear member 30 in a first direction (counter clockwise) via the geared external cylindrical surface 72 the gear member 30 rotates about the screw 62 and translates axially away from the flange 68 until the gear member 30 applies an axial force against the mechanical stop 70 at which point the torque transmitted by the gear member 30 drives the screw 62 to rotate with the gear member 30 and thereby causes the nut 74 to translate axially towards the flange 68. The gear member 30 can apply an axial force against the mechanical stop 70 via direct contact or via contacting other components that press up against the mechanical stop 70. It should be appreciated that many alternative configurations are possible.

In the depicted embodiment, the gear member 30 is configured such that when torque is applied to the gear member 30 in a second direction (clockwise) via the geared external cylindrical surface 72 the gear member 30 rotates about the screw 62 and translates axially until the gear member 30 applies an axial force against the flange 68 at which point the torque drives the screw 62 to rotate with the gear member 30 and thereby causes the nut 74 to translate axially away from the flange 68. The gear member 30 can apply the axial force against the flange 68 by abutting against the flange 68 or by abutting against components that are abutted against the flange 68. It should be appreciated that many alternative configurations are possible.

In the depicted embodiment, the actuator 60 is configured such that when the gear member 30 applies an axial force on the flange 68 and the nut 74 is in a retracted position at least one axially extending flange pin 66 extends from the gear member 30 through the flange 68 into the nut 74 and thereby prevents relative rotation between the nut 74 and the screw 62. It should be appreciated that many alternative configurations are possible.

In the depicted embodiment, the actuator 60 is configured such that when torque is applied to the gear member 30 in a second direction (clockwise) via the geared external cylindrical surface 72 the gear member 30 rotates and translates axially towards the mechanical stop 70. In the depicted embodiment, when torque in the second direction is continued to be applied to the gear member 30 the screw 62 rotates with the gear member 30 which drives the nut 74 to translate axially towards the second end of the second portion of the screw 62. In the depicted embodiment, the pins (pin 66) that lock the nut 74 from rotating relative to the screw 62 are retracted as the gear member 30 translates axially towards the mechanical stop 70. It should be appreciated that many alternative configurations are possible.

Figure 14:
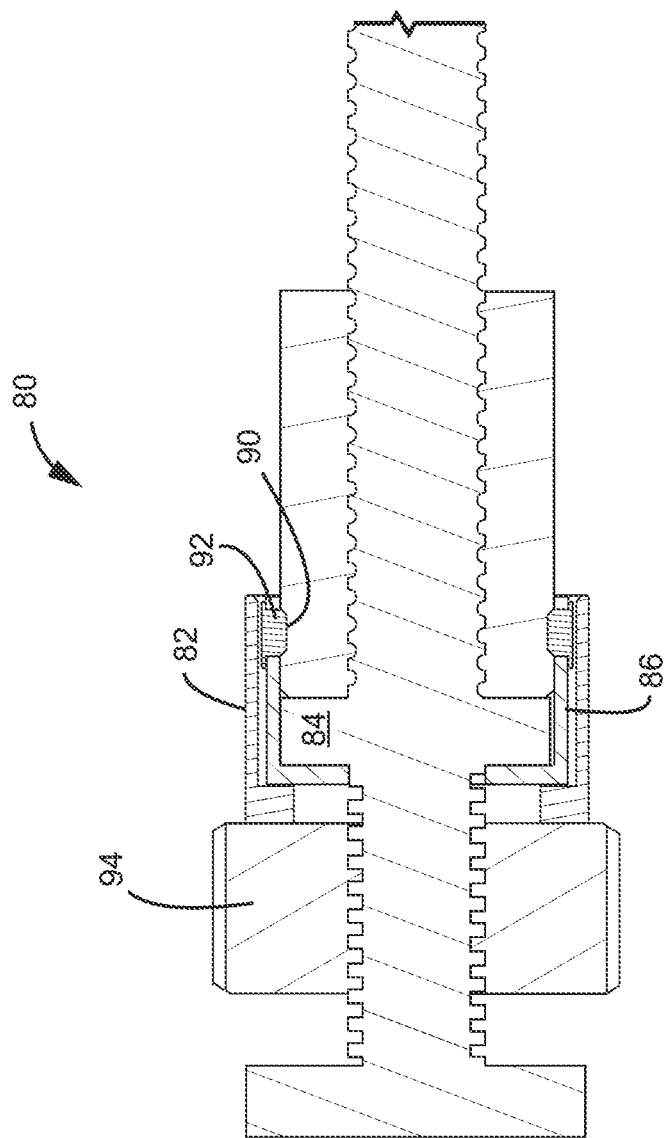
FIG. 14 is a cross-section of an alternative embodiment of the screw drive of FIG. 1.

Referring to FIG. 14, an alternative embodiment of the actuator of the present disclosure is described in further detail. In the depicted embodiment, the actuator 80 includes an axially translating locking sleeve 82 that extends over a flange 84. In the depicted embodiment, the flange 84 includes a rim portion 86 that extends radially towards a nut 88. In the depicted embodiment, the nut 88 includes a radial locking member recess 90 that receives a radially locking member 92. In the depicted embodiment, the radially locking member 92 is held in engagement with the radial locking member recess 90 when the translating locking sleeve 82 is biased against the flange 84 by a gear member 94. In the depicted embodiment, the translating locking sleeve 82 is spring biased towards the first end of the first cylindrical portion of the screw 96. In the depicted embodiment, when the gear member 94 translates axially away from the flange 84 the translating locking sleeve 82 moves axially towards the first end of the first cylindrical portion thereby allowing the radially locking member 92 to move radially outwardly from the radial locking member recess 90.

One aspect of the invention includes a linear actuator comprising: a screw including a first end portion and a second end portion, the first end portion defining a cylindrical cavity concentric about a longitudinal screw axis, the second end portion including a cylindrical shaft portion concentric about the longitudinal screw axis, the second end portion having an external thread; a nut coaxially arranged on the second cylindrical portion having an inner aperture having an inner thread engaged with the external thread of the second end portion of the screw, the nut including a first end portion that defines a cylindrical nut cavity that is configured to receive a portion of the first end portion of the screw, the nut cavity including an inwardly radially extending retaining lip; a locking member extending through a portion of the first end portion of the screw and configured to catch on the retaining lip of the nut cavity when in a first position; a sliding drive gear including a gear interface at a first end and a locking member interface at a second end, wherein the sliding drive gear is configured to extend and retract axially and thereby radially bias the locking member into engagement with the retaining lip of the nut cavity; and wherein initial rotation of the sliding drive gear in a first direction translates the sliding drive gear axially without rotating the screw and subsequent rotation of the sliding drive gear in the first direction rotates the screw and thereby drives axial motion of the nut.

Another aspect of the invention includes a linear actuator wherein the sliding drive gear includes a generally cylindrical body, a first end portion including an annular cavity having a gear periphery configured to engage a geared drive, and a second end portion having a cylindrical outer surface configured to selectively support the locking segments.

Another aspect of the invention includes a linear actuator wherein the axially sliding drive gear includes a helical slot that engages a pin that extends inwardly from the first end portion of the screw.

Another aspect of the invention includes a linear actuator that further comprises a bearing interfacing between the sliding drive gear and the nut cavity.

Another aspect of the invention includes a linear actuator that further comprises a no-back system arranged about the first end portion of the screw.

Another aspect of the invention includes a linear actuator that further comprises a locking member retention sleeve coaxial with the first end portion of the screw, the locking member retention sleeve is spring biased toward the second end portion of the screw.

Another aspect of the invention includes a linear actuator that further comprises a locking member retention sleeve coaxial with the first end portion of the screw and spring biased toward the second end portion of the screw, wherein the locking member retention sleeve includes a shoulder that slides on the first end portion of the screw and a lip that engages a portion of a housing to limit the translation of the locking member retention sleeve in the second direction, wherein the shoulder in a first position retains the locking segment in the first end portion of the screw.

Another aspect of the invention includes a linear actuator comprising: a screw including a first cylindrical portion and a second cylindrical portion, the first cylindrical portion including a first end and a second end, the first cylindrical portion having a first hand screw thread defined on an exterior surface, the second cylindrical portion including a first end and a second end, the second cylindrical portion having a second hand screw thread defined on an exterior surface; a flange located between the first cylindrical portion and the second cylindrical portion; a mechanical stop located at the first end of the first cylindrical portion of the screw; a gear member coaxially arranged on the first cylindrical portion of the screw, the gear member having an inner aperture mated with the first hand screw thread of the first cylindrical portion, the gear member defining a geared external cylindrical surface; a nut coaxially arranged on the second cylindrical portion having an inner aperture mated with the second hand screw thread of the second cylindrical portion; wherein when the gear member is configured such that when torque is applied to the gear member in a first direction via the geared external cylindrical surface, the gear member rotates about the screw and translates axially away from the flange until the gear member applies an axial force against the mechanical stop at which point the torque drives the screw to rotate with the gear member and thereby causes the nut to translate axially towards the flange; and wherein when the gear member is configured such that when torque is applied to the gear member in a second direction via the geared external cylindrical surface, the gear member rotates about the screw and translates axially until the gear member applies an axial force against the flange at which point the torque drives the screw to rotate with the gear member and thereby causes the nut to translate axially away from the flange.

Another aspect of the invention includes a linear actuator wherein the linear actuator is configured such that when the gear member applies an axial force on the flange and the nut is in a retracted position, flange pins extend from the gear member through the flange into the nut and thereby prevents relative rotation between the nut and the screw.

Another aspect of the invention includes a linear actuator wherein the gear member is configured such that when torque is applied to the gear member in a second direction (clockwise) via the geared external cylindrical surface, the gear member rotates and translates axially towards the mechanical stop, wherein when torque in the second direction is continued to be applied to the gear member the screw rotates with the gear member, wherein the nut translates axially towards the second end of the second portion of the screw when the screw rotates in the second direction; and wherein pins that lock the nut from rotating relative to the screw are retracted as the gear member translates towards the mechanical stop.

Another aspect of the invention includes a linear actuator wherein the linear actuator includes an axially translating locking sleeve that extends over the flange, wherein the flange includes a rim portion that extends towards the nut, wherein the nut includes a radial locking member recess that receives a radially locking member, wherein the radially locking member is held in engagement with the radial locking member recess when the translating locking sleeve is biased against the flange by the gear member, wherein the translating locking sleeve is spring biased towards the first end of the first cylindrical portion, wherein when the gear member translates axially away from the flange the translating locking sleeve moves axially towards the first end of the first cylindrical portion thereby allowing the radially locking member to move radially outwardly from the radial locking member recess.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A linear actuator comprising:
    a cylindrical screw including a first end portion and a second end portion, the second end portion including a shaft portion that defines a longitudinal screw axis, the second end portion having an external thread;
    a nut coaxially arranged on the second end portion having an inner nut aperture having an internal thread mated with the external thread of the second end portion, the nut configured to axially translate along the second end portion from a retracted position to an extended position;
    a torque transmitting screw drive member that is configured to transmit torque to the screw and drive rotation of the screw about the longitudinal screw axis; and a mechanical nut locking system configured to automatically lock the nut when the nut is retracted, wherein the mechanical nut locking system automatically disengages a mechanical lock when the torque transmitting screw drive member is initially rotated in a first direction that extends the nut;

wherein the torque transmitting screw drive member includes a helical slot that engages a pin that extends radially inwardly from the first end portion of the screw, wherein the helical slot enables the torque transmitting screw drive member to rotate without rotating the screw.

2. The linear actuator of claim 1, wherein when the torque transmitting screw drive member is rotated in the first direction to extend the nut, the torque transmitting screw drive member translates axially prior to transmitting torque to the screw, wherein the axial translation of the torque transmitting screw drive member disengages the mechanical lock of the mechanical nut locking system.

3. The linear actuator of claim 1, wherein when the torque transmitting screw drive member is rotated in the first direction to extend the nut, the torque transmitting screw drive member translates axially to disengage the mechanical lock and then subsequently rotates the screw and extends the nut.

4. The linear actuator of claim 1, wherein when the torque transmitting screw drive member is driven in a second direction opposite from the first direction to retract the nut from the extended position, the torque transmitting screw drive member rotates the screw in the second direction to retract the nut and subsequently translates axially without further rotating the screw to engage the mechanical nut locking system.

5. The linear actuator of claim 1, wherein the torque transmitting screw drive member includes a splined female gear at a first end and a cylindrical locking segment interface surface at a second end.

6. The linear actuator of claim 1, wherein the mechanical nut locking system includes a locking member extending through a portion of the first end portion of the screw and configured to selectively engage a retaining lip of the nut.

7. The linear actuator of claim 6, wherein the locking member is a segmented ring.

8. The linear actuator of claim 1, wherein the mechanical nut locking system includes a segment retention sleeve, wherein the segment retention sleeve is coaxial with the first end portion of the screw and spring biased toward the second end portion of the screw, wherein the segment retention sleeve includes a shoulder that slides on the first end portion of the screw.

9. The linear actuator of claim 1, wherein the first end portion of the screw defines a cylindrical cavity concentric about the longitudinal screw axis, wherein the second end portion of the screw defines a cylindrical shaft portion concentric about the longitudinal screw axis;

wherein a first end portion of the nut defines a cylindrical nut cavity that is configured to receive a portion of the first end portion of the screw, the cylindrical nut cavity including an inwardly radially extending retaining lip;

the linear actuator further including a locking member extending through the portion of the first end portion of the screw and configured to catch on the retaining lip of the cylindrical nut cavity when in a first position;

the torque transmitting screw drive member including a sliding drive gear including a gear interface at a first end and a locking member interface at a second end, wherein the sliding drive gear is configured to extend and retract axially and thereby radially bias the locking member into engagement with the retaining lip of the cylindrical nut cavity; and wherein initial rotation of the sliding drive gear in the first direction translates the sliding drive gear axially without rotating the screw and subsequent rotation of the sliding drive gear in the first direction rotates the screw and thereby drives axial motion of the nut.

10. The linear actuator of claim 9, wherein the sliding drive gear includes a generally cylindrical body, the gear interface at the first end of the sliding drive gear including an annular cavity having a gear periphery configured to engage a geared drive, and the locking member interface at the second end of the sliding drive gear having a cylindrical outer surface configured to selectively support the locking member.

11. The linear actuator of claim 9, further comprising a locking member retention sleeve coaxial with the first end portion of the screw and spring biased in a biasing direction toward the second end portion of the screw, wherein the locking member retention sleeve includes a shoulder that slides on the first end portion of the screw and a lip that engages a portion of a housing to limit the translation of the locking member retention sleeve in the biasing direction such that the locking member retention sleeve stops at a retention position, wherein when the locking member retention sleeve is in the retention position, the shoulder retains the locking member in the first end portion of the screw.

12. A linear actuator comprising:
a cylindrical screw including a first end portion and a second end portion, the second end portion including a shaft portion that defines a longitudinal screw axis, the second end portion having an external thread;
a nut coaxially arranged on the second end portion having an inner nut aperture having an internal thread mated with the external thread of the second end portion, the nut configured to axially translate along the second end portion from a retracted position to an extended position;
a torque transmitting screw drive member that is configured to transmit torque to the screw and drive rotation of the screw about the longitudinal screw axis; and
a mechanical nut locking system configured to automatically lock the nut when the nut is retracted, wherein the mechanical nut locking system automatically disengages a mechanical lock when the torque transmitting screw drive member is initially rotated in a first direction that extends the nut; and
wherein the mechanical nut locking system includes a locking member extending through a portion of the first end portion of the screw and configured to selectively engage a retaining lip of the nut.

13. The linear actuator of claim 12, wherein the locking member is a segmented ring.

14. A linear actuator comprising:
a cylindrical screw including a first end portion and a second end portion, the second end portion including a shaft portion that defines a longitudinal screw axis, the second end portion having an external thread;
a nut coaxially arranged on the second end portion having an inner nut aperture having an internal thread mated with the external thread of the second end portion, the nut configured to axially translate along the second end portion from a retracted position to an extended position;

a torque transmitting screw drive member that is configured to transmit torque to the screw and drive rotation of the screw about the longitudinal screw axis; and a mechanical nut locking system configured to automatically lock the nut when the nut is retracted, wherein the mechanical nut locking system automatically disengages a mechanical lock when the torque transmitting screw drive member is initially rotated in a first direction that extends the nut; and wherein the mechanical nut locking system includes a segment retention sleeve, wherein the segment retention sleeve is coaxial with the first end portion of the screw and spring biased toward the second end portion of the screw, wherein the segment retention sleeve includes a shoulder that slides on the first end portion of the screw.

15. A linear actuator comprising:

a cylindrical screw including a first end portion and a second end portion, the second end portion including a shaft portion that defines a longitudinal screw axis, the second end portion having an external thread;

a nut coaxially arranged on the second end portion having an inner nut aperture having an internal thread mated with the external thread of the second end portion, the nut configured to axially translate along the second end portion from a retracted position to an extended position;

a torque transmitting screw drive member that is configured to transmit torque to the screw and drive rotation of the screw about the longitudinal screw axis; and a mechanical nut locking system configured to automatically lock the nut when the nut is retracted, wherein the mechanical nut locking system automatically disengages a mechanical lock when the torque transmitting screw drive member is initially rotated in a first direction that extends the nut;

wherein the first end portion of the screw defines a cylindrical cavity concentric about the longitudinal screw axis, wherein the second end portion of the screw defines a cylindrical shaft portion concentric about the longitudinal screw axis;

wherein a first end portion of the nut defines a cylindrical nut cavity that is configured to receive a portion of the first end portion of the screw, the cylindrical nut cavity including an inwardly radially extending retaining lip;

the linear actuator further including a locking member extending through the portion of the first end portion of the screw and configured to catch on the retaining lip of the cylindrical nut cavity when in a first position; and the torque transmitting screw drive member including a sliding drive gear including a gear interface at a first end and a locking member interface at a second end, wherein the sliding drive gear is configured to extend and retract axially and thereby radially bias the locking member into engagement with the retaining lip of the cylindrical nut cavity;

wherein initial rotation of the sliding drive gear in the first direction translates the sliding drive gear axially without rotating the screw and subsequent rotation of the sliding drive gear in the first direction rotates the screw and thereby drives axial motion of the nut.

16. The linear actuator of claim 15, wherein the sliding drive gear includes a generally cylindrical body, the gear interface at the first end of the sliding drive gear including an annular cavity having a gear periphery configured to engage a geared drive, and the locking member interface at the second end of the sliding drive gear having a cylindrical outer surface configured to selectively support the locking member, wherein the sliding drive gear includes a helical slot that engages a pin that extends inwardly from the first end portion of the screw.

17. The linear actuator of claim 15, further comprising a locking member retention sleeve coaxial with the first end portion of the screw and spring biased in a biasing direction toward the second end portion of the screw, wherein the locking member retention sleeve includes a shoulder that slides on the first end portion of the screw and a lip that engages a portion of a housing to limit the translation of the locking member retention sleeve in the biasing direction such that the locking member retention sleeve stops at a retention position, wherein when the locking member retention sleeve is in the retention position, the shoulder retains the locking member in the first end portion of the screw.

18. A linear actuator comprising:

a cylindrical screw including a first end portion and a second end portion, the second end portion including a shaft portion that defines a longitudinal screw axis, the second end portion having an external thread;

a nut coaxially arranged on the second end portion having an inner nut aperture having an internal thread mated with the external thread of the second end portion, the nut configured to axially translate along the second end portion from a retracted position to an extended position;

a torque transmitting screw drive member that is configured to transmit torque to the screw and drive rotation of the screw about the longitudinal screw axis; and a mechanical nut locking system configured to automatically lock the nut when the nut is retracted, wherein the mechanical nut locking system automatically disengages a mechanical lock when the torque transmitting screw drive member is initially rotated in a first direction that extends the nut; and wherein the cylindrical screw includes:

a first cylindrical portion and a second cylindrical portion, the first cylindrical portion including a first end and a second end, the first cylindrical portion having a first hand screw thread defined on an exterior surface of the first cylindrical portion, the second cylindrical portion including a first end and a second end, the second cylindrical portion having a second hand screw thread defined on an exterior surface of the second cylindrical portion;

a flange located between the first cylindrical portion and the second cylindrical portion;

a mechanical stop located at the first end of the first cylindrical portion of the screw; and a gear member coaxially arranged on the first cylindrical portion of the screw, the gear member having an inner gear aperture mated with the first hand screw thread of the first cylindrical portion, the gear member defining a geared external cylindrical surface; and wherein the nut is coaxially arranged on the second cylindrical portion with the inner nut aperture mated with the second hand screw thread of the second cylindrical portion.

19. The linear actuator of claim 18, wherein the linear actuator is configured such that when the gear member applies axial force on the flange and the nut is in the retracted position, flange pins extend from the gear member through the flange into the nut and thereby prevent relative rotation between the nut and the screw.

20. The linear actuator of claim 18, wherein the linear actuator includes an axially translating locking sleeve that extends over the flange, wherein the flange includes a rim portion that extends towards the nut, wherein the nut includes a radial locking member recess that receives a radially locking member, wherein the radially locking member is held in engagement with the radial locking member recess when the axially translating locking sleeve is moved against the flange by the gear member, wherein when the gear member translates axially away from the flange, the axially translating locking sleeve moves axially towards the first end of the first cylindrical portion thereby allowing the radially locking member to move radially outwardly from the radial locking member recess.

\* \* \* \* \*